United States Patent
Schuler et al.

(10) Patent No.: US 10,989,089 B2
(45) Date of Patent: Apr. 27, 2021

(54) PARTICLE FILTER HAVING SCR-ACTIVE COATING

(71) Applicant: Umicore AG & Co. KG, Hanau-Wolfgang (DE)

(72) Inventors: Anke Schuler, Niedernberg (DE); Katja Adelmann, Bickenbach (DE); Franz Dornhaus, Kobe (JP); Michael Schiffer, Hanau (DE); Stephan Eckhoff, Alzenau (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 117 days.

(21) Appl. No.: 16/323,618

(22) PCT Filed: Aug. 11, 2017

(86) PCT No.: PCT/EP2017/070401
§ 371 (c)(1),
(2) Date: Feb. 6, 2019

(87) PCT Pub. No.: WO2018/029330
PCT Pub. Date: Feb. 15, 2018

(65) Prior Publication Data
US 2019/0203625 A1 Jul. 4, 2019

(30) Foreign Application Priority Data
Aug. 11, 2016 (EP) .................................. 16183868

(51) Int. Cl.
*F01N 3/20* (2006.01)
*B01J 37/02* (2006.01)
(Continued)

(52) U.S. Cl.
CPC ....... *F01N 3/2066* (2013.01); *B01D 53/9418* (2013.01); *B01J 29/723* (2013.01);
(Continued)

(58) Field of Classification Search
CPC ........ B01D 53/9418; B01D 2251/2062; B01D 2255/50; B01D 2255/9022;
(Continued)

(56) References Cited

U.S. PATENT DOCUMENTS

| 9,657,666 B2 * | 5/2017 | Nishijima ............. F01N 3/2073 |
| 2010/0034717 A1 | 2/2010 | Adelmann et al. |

(Continued)

FOREIGN PATENT DOCUMENTS

| EP | 1300193 A1 | 4/2003 |
| EP | 2335810 A1 | 6/2011 |

(Continued)

OTHER PUBLICATIONS

Oral Summons received in EP17748810 mailed Apr. 23, 2020.
(Continued)

*Primary Examiner* — Audrey K Bradley
*Assistant Examiner* — Dapinder Singh
(74) *Attorney, Agent, or Firm* — Suzannah K. Sundby, Esq.; Canady + Lortz LLP

(57) ABSTRACT

The invention relates to a particle filter, which comprises a wall flow filter and SCR-active material, wherein the wall flow filter comprises ducts which extend in parallel between the first and the second end of the wall flow filter and which are alternately closed in a gas-tight manner either at the first or the second end and which are separated by porous walls, the pores of which have inner surfaces, and the SCR-active material is located in the form of a coating on the inner surfaces of the pores of the porous walls, characterized in that the coating has a gradient, such that the side of the coating facing the exhaust gas has a higher selectivity in the SCR reaction than the side of the coating that faces the inner surfaces of the pores. The SCR-active material is preferably (Continued)

Figure 1:
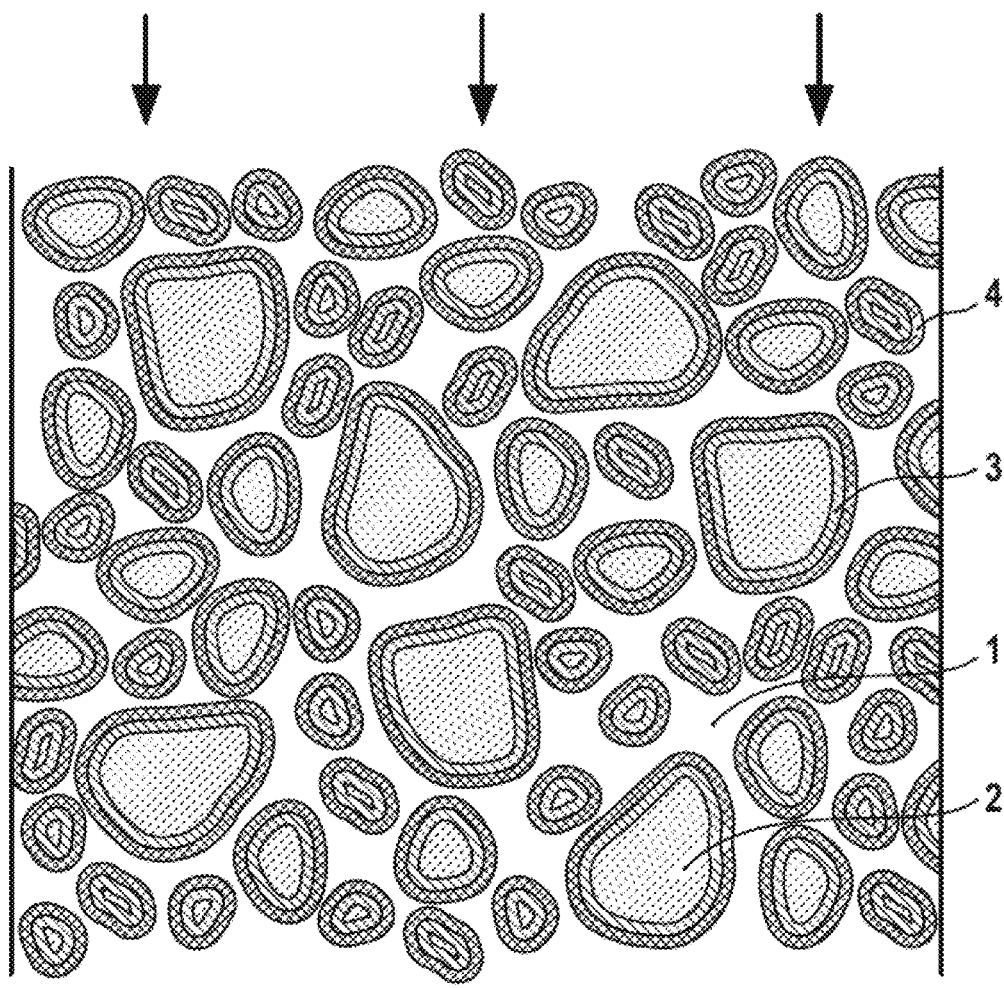

a small-pore zeolite, which has a maximum ring size of eight tetrahedral atoms and is exchanged with copper and/or iron.

22 Claims, 2 Drawing Sheets

(51) Int. Cl.
| | |
|---|---|
| B01D 53/94 | (2006.01) |
| B01J 29/72 | (2006.01) |
| B01J 35/00 | (2006.01) |
| B01J 35/04 | (2006.01) |
| F01N 3/022 | (2006.01) |
| F01N 3/035 | (2006.01) |

(52) U.S. Cl.
CPC .......... *B01J 35/0073* (2013.01); *B01J 35/04* (2013.01); *B01J 37/0244* (2013.01); *B01J 37/0246* (2013.01); *F01N 3/0222* (2013.01); *F01N 3/035* (2013.01); B01D 2251/2062 (2013.01); B01D 2255/50 (2013.01); B01D 2255/905 (2013.01); B01D 2255/9022 (2013.01); B01D 2255/9155 (2013.01); B01D 2258/012 (2013.01); F01N 2330/06 (2013.01); F01N 2330/30 (2013.01); F01N 2370/04 (2013.01); Y02T 10/12 (2013.01)

(58) Field of Classification Search
CPC ...... B01D 2255/905; B01D 2255/9155; B01D 2258/012; B01J 29/723; B01J 37/0244; B01J 37/0246; F01N 3/0222; F01N 3/035; F01N 3/208; F01N 3/2066; F01N 2330/06; F01N 2330/30; F01N 2370/04; Y02T 10/24
USPC .... 55/495, 523, 524; 60/274, 277, 286, 295, 60/297, 299–301, 311; 95/45, 196
See application file for complete search history.

(56) References Cited

U.S. PATENT DOCUMENTS

| | | | |
|---|---|---|---|
| 2010/0077737 A1* | 4/2010 | Girard | ............... F01N 3/208 60/295 |
| 2011/0146237 A1 | 6/2011 | Adelmann et al. | |
| 2011/0274601 A1 | 11/2011 | Boorse | |
| 2012/0186229 A1* | 7/2012 | Phillips | ............... F01N 3/2066 60/274 |
| 2012/0247092 A1 | 10/2012 | Boorse | |
| 2013/0004391 A1 | 1/2013 | Pfeifer et al. | |
| 2013/0121902 A1 | 5/2013 | Adelmann et al. | |
| 2014/0041366 A1 | 2/2014 | Seyler et al. | |
| 2015/0283507 A1 | 10/2015 | Schraml et al. | |

FOREIGN PATENT DOCUMENTS

| | | | |
|---|---|---|---|
| EP | 2597279 | A1 | 5/2013 |
| EP | 2857084 | A1 | 4/2015 |
| EP | 3081775 | A1 | 10/2016 |
| JP | 2013139035 | A | 7/2013 |
| WO | 2005016497 | A1 | 2/2005 |
| WO | 2008049491 | A1 | 5/2008 |
| WO | 2009124643 | A1 | 10/2009 |
| WO | 2011116907 | A2 | 9/2011 |
| WO | 2011128026 | A1 | 10/2011 |
| WO | 2011131324 | A1 | 10/2011 |
| WO | 2012168277 | A1 | 12/2012 |
| WO | 2016138418 | A1 | 9/2016 |
| WO | 2016205509 | A1 | 12/2016 |
| WO | 2018025244 | A1 | 2/2018 |
| WO | 2018025245 | A1 | 2/2018 |

OTHER PUBLICATIONS

International Search Report received in PCT/EP2017/070401 dated Oct. 30, 2017.
Written Opinion received in PCT/EP2017/070401 dated Oct. 30, 2017.
Examination Report received in EP 16183868.5 dated Jun. 14, 2019.
International Preliminary Report on Patentability received in PCT/EP2017/070401 dated Feb. 12, 2019.

* cited by examiner

PARTICLE FILTER HAVING SCR-ACTIVE COATING

The present invention relates to a particle filter with SCR-active coating for the simultaneous reduction of particles and nitrogen oxides in the exhaust gas of combustion engines.

Exhaust gases from motor vehicles with a predominantly lean-operated combustion engine contain, in particular, the primary emissions of carbon monoxide CO, hydrocarbons HC, and nitrogen oxides NOx in addition to particle emissions. Due to the relatively high oxygen content of up to 15 vol. %, carbon monoxide and hydrocarbons may relatively easily be rendered harmless by means of oxidation; however, reducing nitrogen oxides to nitrogen is much more difficult.

A known method for removing nitrogen oxides from exhaust gases in the presence of oxygen is the selective catalytic reduction method (SCR method) using ammonia on a suitable catalyst—the SCR catalyst. In this method, the nitrogen oxides to be removed from the exhaust gas are converted to nitrogen and water using ammonia.

The ammonia used as reducing agent may be made available by feeding a compound which decomposes to ammonia, such as urea, ammonium carbamate or ammonium formate, into the exhaust gas stream, and subsequent hydrolysis.

Particles may be very effectively removed from the exhaust gas with the aid of particle filters. Wall flow filters made from ceramic materials have especially proven themselves. These wall flow filters are made up of a plurality of parallel channels that are formed by porous walls. The channels are alternately sealed in a gas-tight manner at one of the two ends of the filter so that channels A, which are open at the first side of the filter and sealed at the second side of the filter, and channels B, which are sealed at the first side of the filter and open at the second side of the filter, are formed. The exhaust gas flowing into channels A, for example, may leave the filter again only via the channels B and must, for this purpose, flow through the porous walls between the channels A and B. The particles are retained when the exhaust gas passes through the wall.

It is also already known to coat wall flow filters with SCR-active material and to thus simultaneously remove particles and nitrogen oxides from the exhaust gas.

Insofar as the required quantity of SCR-active material is applied onto the porous walls between the channels, this may however lead to an unacceptable increase in the back pressure of the filter.

With this as the background, JPH01-151706 and WO2005/016497, for example, propose to coat a wall flow filter with an SCR catalyst such that the latter penetrates through the porous walls. For this purpose, the porous walls of the wall flow filter are to have a porosity of at least 50% and an average pore size of at least 5 micron.

It has also already been proposed, see US 2011/274601, to introduce a first SCR catalyst into the porous wall, i.e., to coat the inner surfaces of the pores, and place a second SCR catalyst onto the surface of the porous wall. In this case, the average particle size of the first SCR catalyst is smaller than that of the second SCR catalyst. A wall flow filter which is coated with SCR catalyst is known from US 2012/186229. The SCR catalyst is preferably located on the surfaces of the pores in the filter wall. JP 2013-139035 A discloses a wall flow filter that is coated with two washcoats that each contain β zeolites exchanged with iron.

US 2010/077737 describes a system for reducing nitrogen oxides, comprising two different zeolite-based catalysts that differ in terms of their conversion capabilities for nitrogen oxides. In one embodiment, a copper-exchanged zeolite is coated directly onto the carrier substrate. This layer serves as a carrier for a second layer comprising an iron-exchanged zeolite. The carrier substrate may be a diesel particle filter.

The known wall flow filters coated with SCR catalysts have the disadvantage that their selectivity in the SCR reaction is too low with respect to the undesirable oxidation of ammonia, particularly at high temperatures.

The object of the present invention therefore consists in providing wall flow filters coated with SCR-active material, which filters have improved selectivity in the SCR reaction, particularly at temperatures in excess of 600° C.

The present invention relates to a particle filter comprising a wall flow filter and SCR-active material, wherein the wall flow filter comprises channels which extend parallelly between a first and a second end of the wall flow filter, which are alternatingly sealed in a gas-tight manner either at the first or at the second end, and which are separated by porous walls whose pores have inner surfaces, and the SCR-active material is located in the form of a coating on the inner surfaces of the pores of the porous walls, characterized in that the coating has a gradient so that the side of the coating facing the exhaust gas has a higher selectivity in the SCR reaction than the side of the coating facing the inner surfaces of the pores.

Wall flow filters that may be used according to the present invention are known and commercially available. They consist, for example, of silicon carbide, aluminum titanate or cordierite. In the uncoated state, they have porosities from 30 to 80, in particular 50 to 75%, for example. In the uncoated state, their average pore size is 5 to 30 micrometers, for example.

Generally, the pores of the wall-flow filter are so-called open pores, i.e., they have a connection to the channels. Furthermore, the pores are normally interconnected with one another. This enables easy coating of the inner pore surfaces on the one hand and, on the other, an easy passage of the exhaust gas through the porous walls of the wall flow filter.

Within the context of the present invention, SCR-active material is a material that can catalyze the SCR-reaction, that is, the conversion of nitrogen oxides with ammonia to nitrogen and water, in the exhaust gas of lean-operated combustion engines. Therefore, a suitable SCR-active material must effectively convert nitrogen oxides under the conditions prevailing in the exhaust gas, which include, for example, temperatures of 200 to 750°. According to the invention, all known SCR-catalytically active materials may, in principle, be used as SCR-active material.

Examples include vanadium-containing or vanadium-free mixed oxides, such as are known, for example, from WO2008/049491 A1, WO2011/116907 A2 and WO2011/131324 A1, as well as mixtures of mixed oxides with zeolite-based SCR catalysts, as are known, for example, from WO2009/124643 A1, EP 2 335 810 A1 and WO2012/168277 A1.

In special embodiments of the present invention, the SCR-active material comprises a small-pore zeolite which is exchanged with copper and/or iron.

Small-pore zeolites have a maximum ring size of eight tetrahedral atoms. Zeolites of this type that are known to the person skilled in the art may be used. These include naturally occurring but preferably synthetically produced small-pore zeolites.

Examples of synthetically produced small-pore zeolites belong to the structure types ABW, ACO, AEI, AEN, AFN, AFT, AFX, ANA, APC, APD, ATN, ATT, ATV, AWO, AWW, BIK, BRE, CAS, CDO, CHA, DDR, DFT, EAB, EDI, EPI, ERI, ESV, GIS, GOO, IHW, ITE, ITW, JBW, KFI, LEV, LTA, LTJ, MER, MON, MTF, NSI, OWE, PAU, PHI, RHO, RTE, RTH, SAS, SAT, SAV, SIV, THO, TSC, UEI, UFI, VNI, YUG and ZON. Preferred small-pore zeolites are zeolites that belong to the structure types AEI, CHA (chabazite), ERI (erionite), LEV (levyne), AFX, DDR and KFI. Particularly preferred are the structure types CHA, AEI, ERI and LEV, more particularly preferred are CHA and LEV.

Within the scope of the present invention, the term "zeolite" should not only refer to aluminosilicates but also to silicoaluminophosphates and aluminophosphates, which are occasionally also referred to as zeolite-like compounds.

In embodiments of the present invention, the small-pore zeolites of the aluminosilicate type have an SAR value of 5 to 50, preferably 14 to 40, particularly preferably between 20 and 35.

Suitable silicoaluminophosphates or aluminophosphates also belong, in particular, to the structure types AEI, CHA (chabazite), ERI (erionite), LEV (levyne), AFX, DDR and KFI. Such materials may be found under the relevant three-letter code of the Structure Database of the International Zeolite Association under Related Materials (http://www.iza-structure.org/databases/).

Examples include SAPO-17, SAPO-18, SAPO-34, SAPO-35, SAPO-39, SAPO-43, SAPO-47 and SAPO-56 or AlPO-17, AlPO-18, AlPO-34 and AlPO-35. The aforementioned preferred SAR values of aluminosilicates do not apply to these materials.

The specified zeolites are exchanged with iron and/or copper, in particular with copper. The amounts of iron or copper are, in particular, 0.2 to 6 wt. %, calculated as $Fe_2O_3$ or CuO and based on the total weight of the exchanged zeolites.

According to the invention, the coating of the inner surfaces of the pores of the porous walls with SCR-active material has a gradient. This gradient may be continuous, that is, the selectivity of the SCR-active material decreases continuously from the side of the coating facing the exhaust gas to the side of the coating facing the inner surfaces of the pores.

In embodiments of the present invention, however, the gradient is discontinuous. In this case, the coating consists, for example, of two or a plurality of layers that differ with respect to the selectivity of the SCR-active material. In this respect, the outermost layer, that is, the layer facing the exhaust gas has the highest selectivity and the innermost layer has the lowest selectivity.

In a particular embodiment of the present invention, the coating consists of two layers, wherein the layer facing the exhaust gas has a higher selectivity in the SCR reaction than the layer facing the inner surface of the pores.

In the context of the present patent application, the term "selectivity" is defined as the quotient of the conversion of $NO_x$ and the conversion of $NH_3$, therefore $S=X_{(NOx)}/X_{(NH3)}$ applies, where S is the selectivity, $X_{(NOx)}$ the conversion of $NO_x$ in %, and $X_{(NH3)}$ the conversion of $NH_3$ in %.

The higher the quotient, the more selective the SCR-active material or the SCR-active coating with regard to the desired selective catalytic reaction of $NO_x$ and $NH_3$ to nitrogen and water with respect to the undesirable oxidation of $NH_3$ with oxygen to nitrogen or even $NO_x$.

In order to determine $X_{(NOx)}$ and $X_{(NH3)}$, a wall flow filter is coated with the SCR-active material of each coating, then hydrothermally aged for 16 hours at 800° C., and then the conversion of $NO_x$ or $NH_3$ is determined at 500° C. in a test gas with the following composition:

| | |
|---|---|
| $N_2$ | Balance |
| $O_2$ | 10 percent by volume |
| NOx | 500 ppm |
| $NO_2$ | 0 ppm |
| $NH_3$ | 750 ppm |
| CO | 350 ppm |
| $C_3H_6$ | 100 ppm |
| $H_2O$ | 5 percent by volume |
| GHSV/$h^{-1}$ | 60,000 |

The quotient $X_{(NOx)}/X_{(NH3)}$ is then calculated. The coating with the highest quotient is then arranged according to the invention such that it is facing the exhaust gas, whilst the coating with the lowest quotient is arranged such that it faces the wall flow filter.

Furthermore, it should be ensured that, in addition to the aforementioned test conditions, all other test conditions are also the same. In particular, identical wall flow filters and identical coating methods should be used.

A specific example for determining the quotient $S=X_{(NOx)}/X_{(NH3)}$ is described in example 2.

In a further embodiment of the present invention, the amount of coating with SCR-catalytically active material is 70 to 150, in particular 90 to 130 g/L, in relation to the volume of the wall flow filter. Insofar as the coating with SCR-catalytically active material consists of two layers, the mass concentration of a layer is, for example, 40 to 100 g/L and that of the others 30 to 50 g/L.

In one embodiment of the present invention, the coating with SCR-active material consists of two layers each containing a small-pore zeolite exchanged with copper. In this case, the small-pore zeolite of the layer facing the exhaust gas contains less than 3, preferably 0.3-2.5, particularly preferably 0.5-1.5 wt. % Cu, calculated as CuO and based on the exchanged zeolite of this layer, whilst the small-pore zeolite of the layer facing the inner pore surface contains 1 to 6, preferably 2-5, particularly preferably 3-4.5 wt. % Cu, calculated as CuO and based on the exchanged zeolite of this layer. In this case, the amounts of copper in both layers are to be adjusted with respect to one another such that the coating facing the exhaust gas has the higher selectivity (determined as described above).

In a special embodiment of the invention, the layer facing the exhaust gas may also contain a small-pore zeolite, which was not exchanged with copper but instead is present as H form or as $NH_4$ form.

In a preferred embodiment of the invention, the layer facing the exhaust gas contains less copper calculated as CuO per unit of weight of washcoat than the layer facing the inner pore surface.

It should be taken into account that the preferred amount of copper in relation to the zeolite is dependent upon the $SiO_2/Al_2O_3$ ratio of the zeolite. It generally applies that the amount of exchangeable copper decreases as the $SiO_2/Al_2O_3$ ratio of the zeolite increases. According to the invention, the preferred atomic ratio of the copper exchanged in the zeolite to framework aluminum in the zeolite, hereinafter referred to as Cu/Al ratio, is 0.1 to 0.6.

This corresponds to a theoretical degree of exchange of the copper with the zeolite of 20% to 120%, assuming a complete charge balance in the zeolite via bivalent Cu ions given a degree of exchange of 100%.

In a preferred embodiment of the invention, the ratio of exchanged copper to aluminum (Cu/Al) in the zeolite, which is contained in the layer facing the exhaust gas, has values of 0.1 to 0.3, preferably 0.15 to 0.25 and the Cu/Al ratio of the zeolite, which is contained in the layer facing the inner pore surface, has values of 0.3 to 0.6, preferably values of 0.35 to 0.5.

In a further embodiment of the invention, the layer facing the exhaust gas contains a small-pore zeolite which has a lower $SiO_2/Al_2O_3$ ratio (SAR) than the small-pore zeolite which is contained in the layer facing the inner pore surface.

In a further preferred embodiment of the invention, the mass concentration of coating of the layer facing the exhaust gas is 20-70 g/L, preferably 30-60 g/L and the mass concentration of coating of the layer facing the inner pore surface is 50-120 g/L, preferably 70-100 g/L. The mass of the coating of the layer facing the exhaust gas is preferably less than the mass of the layer facing the inner pore surface.

In an embodiment of the present invention, the coating with SCR-active material consists of two layers each containing a copper-exchanged zeolite of the CHA structure type.

In this case, the chabazite of the layer facing the exhaust gas contains 1 wt. % Cu, calculated as CuO and based on the exchanged chabazite of this layer, whilst the chabazite of the layer facing the inner pore surface contains 3 wt. % Cu, calculated as CuO and based on the exchanged chabazite of this layer. Both coatings are each preferably present in quantities of 50% of the total amount of coating.

In another embodiment of the present invention, the coating with SCR-active material consists of two layers each containing a copper-exchanged zeolite of the LEV structure type.

In this case, the levyne of the layer facing the exhaust gas contains 1 wt. % Cu, calculated as CuO and based on the exchanged levyne of this layer, whilst the levyne of the layer facing the inner pore surface contains 3 wt. % Cu, calculated as CuO and based on the exchanged levyne of this layer. Both coatings are each preferably present in quantities of 50% of the total amount of coating.

It is particularly surprising to the person skilled in the art that the particle filter according to the invention solves the task presented. The contact times of the nitrogen oxides and ammonia to be converted with the catalytically active material are actually particularly short in the particle filter according to the invention, shorter at any rate than in conventionally coated flow-through and wall flow filter substrates. Flow-through substrates are laminarly perfused by exhaust gas, wherein the molecules to be converted are in contact over the entire length of the substrate with the catalytically active coatings on the substrate walls. For the conversion, the reactants diffuse into the catalytically active layer and the resulting conversion products diffuse out of the catalytically active layer back into the exhaust gas stream. This mechanism can take place over the entire length of the substrate.

With wall flow filter substrates, in which the catalytically active coatings are on the filter walls, the flow is turbulent, but the mechanism described above can also take effect. Moreover, the reactants flow through the catalytically active layer and there is a particularly intensive contact when flowing through the filter wall. See, for example, EP 1 300 193 A1. With the particle filter according to the invention, in which the catalytically active coating are located on the pore surfaces in the filter wall, the exhaust gas does not flow through the catalytically active coating nor is a contact possible over the entire length of the filter. On the contrary, there only exists a short contact period during the passage of the exhaust gas through the filter wall during which the reactants and the catalytically active layer may touch each other. Therefore, it could not be anticipated that the gradient of the coating provided according to the invention has any effect at all and the particle filter according to the invention therefore accomplishes the object.

The manufacturing of the particle filter according to the invention may take place according to methods familiar to the person skilled in the art, e.g., according to the typical dip coating method or pump and suction coating method with subsequent thermal post-treatment (calcination and possibly reduction with forming gas or hydrogen).

It is known to the person skilled in the art that the average pore size of the wall flow filter and the average particle size of the SCR-catalytically active materials have to be adapted to each other such that a coating of the inner pore surfaces ensues. In particular, the average particle size of the SCR-catalytically active materials must be small enough to penetrate into the pores of the wall flow filter.

The particle filter according to the invention may advantageously be used to purify exhaust gas from lean-operated combustion engines, particularly diesel engines. It removes particles form the exhaust gas and converts nitrogen oxides contained in the exhaust gas into the harmless compounds nitrogen and water.

The present invention thus also relates to a method for purifying the exhaust gas of lean-operated combustion engines, characterized in that the exhaust gas is passed over a particle filter according to the invention.

This passage usually takes place in the presence of a reducing agent. In the method according to the invention, ammonia is preferably used as reducing agent. For example, the required ammonia may be formed in the exhaust gas system upstream of the particle filter according to the invention, e.g., by means of an upstream nitrogen oxide storage catalyst ("lean NOx trap"—LNT), in particular during operation under rich exhaust gas conditions. This method is known as "passive SCR."

However, ammonia may also be carried along in the "active SCR method" in the form of aqueous urea solution that is dosed in as needed via an injector upstream of the particle filter according to the invention.

Therefore, the present invention also relates to a device for purifying exhaust gas of lean-operated combustion engines, which is characterized in that it comprises a particle filter according to the invention as well as a means for providing a reducing agent.

Ammonia is usually used as reducing agent. In one embodiment of the device according to the invention, the means for providing a reducing agent is therefore an injector for aqueous urea solution. As a general rule, the injector is fed with aqueous urea solution originating from an entrained reservoir, that is, for example, a tank container.

In another embodiment, the means for providing a reducing agent is a nitrogen oxide storage catalyst capable of forming ammonia from nitrogen oxide. Such nitrogen oxide storage catalysts are known to the person skilled in the art and are described extensively in the literature.

It is, for example, known from SAE-2001-01-3625 that the SCR reaction with ammonia proceeds more quickly if the nitrogen oxides are present in a 1:1 mixture of nitrogen monoxide and nitrogen dioxide, or in any event approach this ratio. Since the exhaust gas of lean-operated combustion engines normally has an excess of nitrogen monoxide compared to nitrogen dioxide, the document proposes to increase the proportion of nitrogen dioxide with the aid of an oxidation catalyst.

In one embodiment, the device according to the invention therefore also comprises an oxidation catalyst. In embodiments of the present invention, platinum on a carrier material is used as oxidation catalyst.

All materials that are known to the person skilled in the art for this purpose are considered as carrier materials. They have a BET surface of 30 to 250 m$^2$/g, preferably of 100 to 200 m$^2$/g (specified according to ISO 9277), and are in particular aluminum oxide, silicon oxide, magnesium oxide, titanium oxide, zirconium oxide, cerium oxide, and mixtures or mixed oxides of at least two of these oxides. Aluminum oxide and aluminum/silicon mixed oxides are preferred. If aluminum oxide is used, it is particularly preferably stabilized, for example with lanthanum oxide. The device according to the invention is, for example, constructed such that first the oxidation catalyst, then the injector for aqueous urea solution and then the particle filter according to the invention are arranged in the direction of flow of the exhaust gas. Alternatively, first a nitrogen oxide storage catalyst and then the particle filter according to the invention are arranged in the direction of flow of the exhaust gas. During the regeneration of the nitrogen oxide storage catalyst, ammonia can be formed under reductive exhaust gas conditions. Oxidation catalysts and injectors for aqueous urea solution are superfluous in this case.

The invention is explained in more detail in the following examples and figures.

Figure 2:
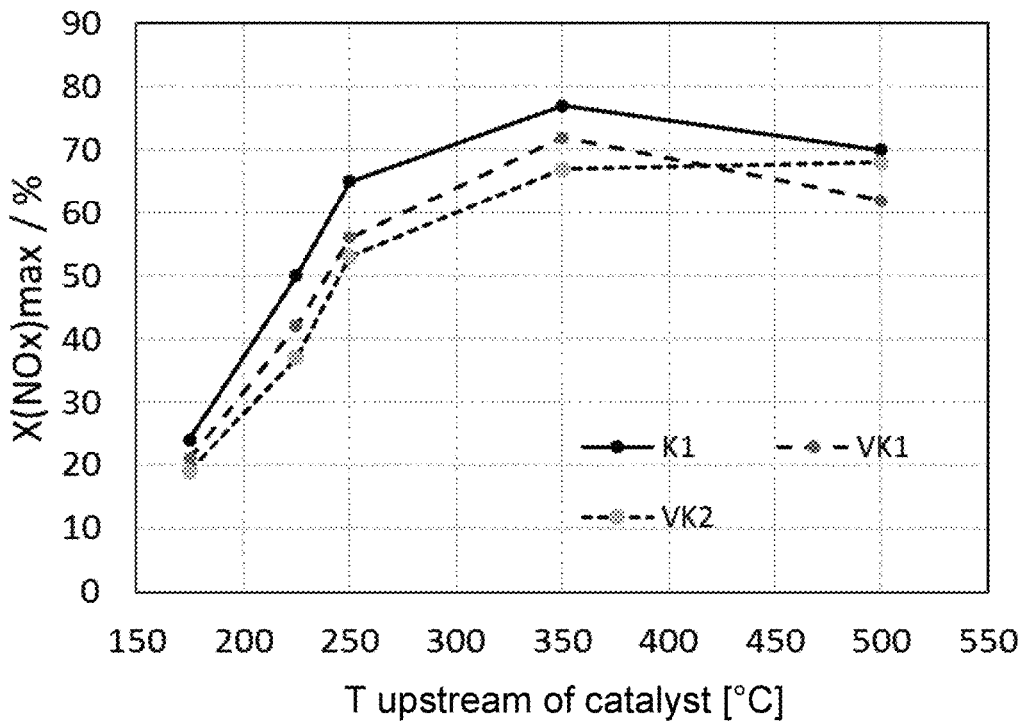

FIG. 1 shows a cross-section through the porous wall of a particle filter according to the invention, comprising two layers with SCR-catalytically active material, wherein
 (1) the pores of the porous wall
 (2) the porous wall
 (3) the layer with the SCR-catalytically active material which has the lower selectivity and
 (4) the layer with the SCR-catalytically active material which has the higher selectivity and The arrows show the direction of the exhaust gas FIG. 2 shows the NO$_x$ conversion of catalysts K1, VK1 and VK2 (example 1 and comparative examples 1 and 2)

Figure 3:
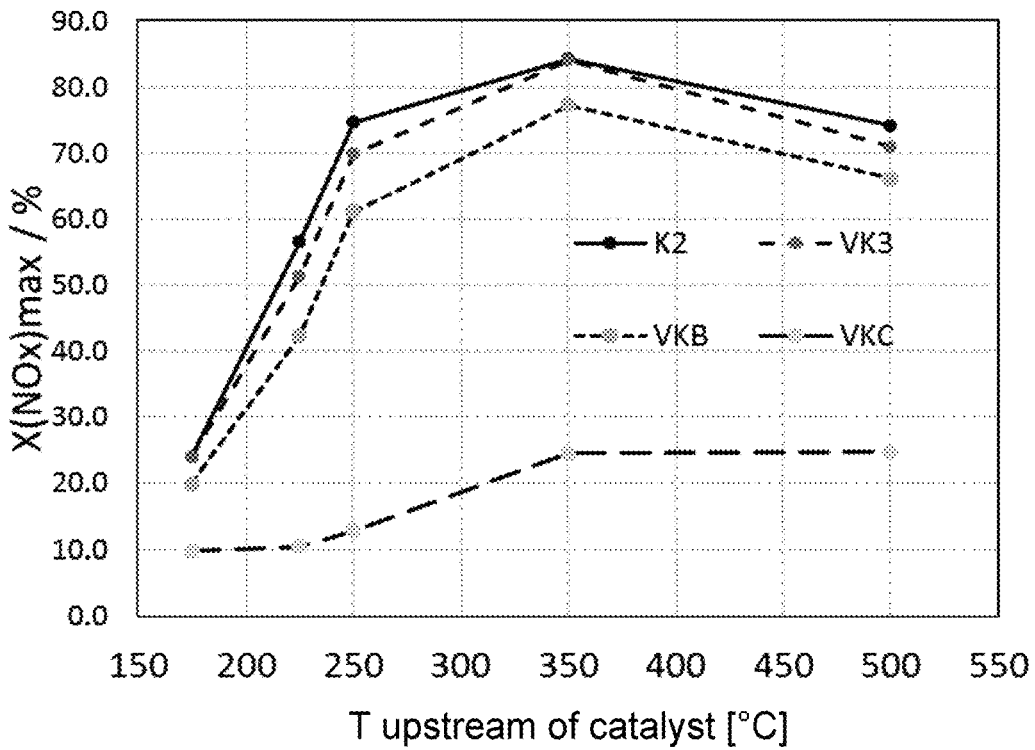

FIG. 3 shows the NO$_x$ conversion of K2 and VK3 (example 2 and comparative example 3) as well as catalysts VKB and VKC from example 2.

EXAMPLE 1 a) A commercially available wall flow filter made of silicon carbide having a porosity of 65% and an average pore size of 23 μm was coated with 60 g/L of a washcoat by means of a conventional dipping method, which washcoat contained a copper-exchanged chabazite, having an SiO$_2$/Al$_2$O$_3$ ratio (SAR) of 30, having an amount of copper of 3 wt. % (calculated as CuO and based on the exchanged chabazite). The average particle size of the copper-exchanged chabazite was 1.16 μm. The coated wall flow filter was then dried and calcined.

b) In a second step, the wall flow filter coated according to a) was provided with a second coating. To this end, coating with 60 g/L of a washcoat was effected by means of a conventional dipping method, which washcoat contained a copper-exchanged chabazite (SAR=30) having an amount of copper of 1 wt. % (calculated as CuO and based on the exchanged chabazite). The average particle size of the copper-exchanged chabazite was 1.05 μm. The coated wall flow filter was then dried and calcined. The amount of copper calculated over the entire wall flow filter was 2 wt. % (calculated as CuO and based on the exchanged chabazite).

The catalyst is referred to below as K1.

COMPARATIVE EXAMPLE 1

A commercially available wall flow filter made of silicon carbide having a porosity of 65% and an average pore size of 23 μm was coated with 120 g/L of a washcoat by means of a conventional dipping method, which washcoat contained a copper-exchanged chabazite (SAR=30) having an amount of copper of 2 wt. % (calculated as CuO and based on the exchanged chabazite). The average particle size of the copper-exchanged chabazite was 1.06 μm. The coated wall flow filter was then dried and calcined.

The amount of copper calculated over the entire wall flow filter was 2 wt. % (calculated as CuO and based on the exchanged chabazite).

The catalyst is referred to below as VK1.

COMPARATIVE EXAMPLE 2 a) A commercially available wall flow filter made of silicon carbide having a porosity of 65% and an average pore size of 23 μm was coated on 50% of its length on the inlet side with 60 g/L of a washcoat by means of a conventional dipping method, which washcoat contained a copper-exchanged chabazite (SAR=30) having an amount of copper of 1 wt. % (calculated as CuO and based on the exchanged chabazite). The average particle size of the copper-exchanged chabazite was 1.05 μm. The coated wall flow filter was then dried and calcined.

b) In a second step, the wall flow filter coated in accordance with a) was also provided with a second coating on the still uncoated section of its length (50%) on the outlet side. To this end, coating with 60 g/L of a washcoat was effected by means of a conventional dipping method, which washcoat contained a copper-exchanged chabazite (SAR=30) having an amount of copper of 3 wt. % (calculated as CuO and based on the exchanged chabazite). The average particle size of the copper-exchanged chabazite was 1.16 μm. The coated wall flow filter was then dried and calcined.

The amount of copper calculated over the entire wall flow filter was 2 wt. % (calculated as CuO and based on the exchanged chabazite).

The catalyst is referred to below as VK2.

Determining the NO$_x$ conversion of K1, VK1, and VK2
a) K1, VK1 and VK2 were first aged for 16 h at 800° C. in a hydrothermal atmosphere (10% water, 10% oxygen, remaining part nitrogen).

b) The NO$_x$ conversion of the particle filter K1 according to the invention and the comparative particle filters VK1 and VK1 depending on the temperature upstream of the catalyst was determined in a model gas reactor in the so-called NO$_x$ conversion test.

The NO$_x$ conversion test consists of a test procedure that comprises a pretreatment and a test cycle that is run through for various target temperatures. The applied gas mixtures are noted in Table 1.

Test Procedure:
1. Preconditioning at 600° C. in nitrogen for 10 min
2. Test cycle repeated for the target temperatures
    a. Approaching the target temperature in gas mixture 1
    b. Addition of NO$_x$ (gas mixture 2)

c. Addition of $NH_3$ (gas mixture 3), wait until $NH_3$ breakthrough>20 ppm, or a maximum of 30 min. in duration d. Temperature-programmed desorption up to 500° C. (gas mixture 3)

The maximum conversion for the test procedure range 2c is determined for each temperature point. A plot as shown in FIG. 2 results from plotting the maximum $NO_x$ conversion for the different temperature points.

| Gas mixture | 1 | 2 | 3 |
|---|---|---|---|
| $N_2$ | Balance | Balance | Balance |
| $O_2$ | 10 percent by volume | 10 percent by volume | 10 percent by volume |
| NOx | 0 ppm | 500 ppm | 500 ppm |
| $NO_2$ | 0 ppm | 0 ppm | 0 ppm |
| $NH_3$ | 0 ppm | 0 ppm | 750 ppm |
| CO | 350 ppm | 350 ppm | 350 ppm |
| $C_3H_6$ | 100 ppm | 100 ppm | 100 ppm |
| $H_2O$ | 5 percent by volume | 5 percent by volume | 5 percent by volume |
| GHSV/h−1 | 60,000 | 60,000 | 60,000 |

As can be seen from FIG. 2, K1 demonstrates a significantly better $NO_x$ conversion compared with VK1 and VK2.

EXAMPLE 2

I) Determining the selectivity in the SCR reaction a) A commercially available wall flow filter made of silicon carbide having a porosity of 63% and an average pore size of 20 μm was coated with 80 g/L of a washcoat by means of a conventional dipping method, which washcoat contained a copper-exchanged chabazite (SAR=30) having an amount of copper of 4.5 wt. % (calculated as CuO and based on the exchanged chabazite). The average particle size of the copper-exchanged chabazite was 1.43 μm. The coated wall flow filter was then dried, calcined at 350° C. and annealed at 550° C.

The catalyst is referred to below as VKB.

b) A commercially available wall flow filter made of silicon carbide having a porosity of 63% and an average pore size of 20 μm was coated with 30 g/L of a washcoat by means of a conventional dipping method, which washcoat contained a copper-exchanged chabazite (SAR=30) having an amount of copper of 2 wt. % (calculated as CuO and based on the exchanged chabazite). The average particle size of the copper-exchanged chabazite was 1.93 μm. The coated wall flow filter was then dried, calcined at 350° C. and annealed at 550° C.

The catalyst is referred to below as VKC.

c) The catalysts VKB and VKC were hydrothermally aged for 16 hours at 800° C. and then their conversions of $NO_x$ and $NH_3$ were determined under the test conditions specified in the following table.

| Temperature | 500° C. |
|---|---|
| $N_2$ | Balance |
| $O_2$ | 10 percent by volume |
| NOx | 500 ppm |
| $NO_2$ | 0 ppm |
| $NH_3$ | 750 ppm |
| CO | 350 ppm |
| $C_3H_6$ | 100 ppm |
| $H_2O$ | 5 percent by volume |
| GHSV/h−1 | 60,000 |

Afterwards, the quotient for VKB and VKC was determined from the conversion of $NO_x$ and the conversion of $NH_3$. The following results were obtained:

|  | VKB | VKC |
|---|---|---|
| $X(NO_x)/\%$ | 66.20 | 24.74 |
| $X(NH_3)/\%$ | 96.18 | 30.06 |
| $X(NO_x)/x(NH_3)$ | 0.69 | 0.82 |

It was shown that VKC has a higher quotient from the conversions of $NO_x$ and $NH_3$ than VKB. Therefore, VKC is to be coated on the side facing the gas and VKB on the side facing the wall flow filter.

II) In accordance with the findings in the preceding paragraph Ic), a particle filter according to the invention was obtained as follows:

A commercially available wall flow filter made of silicon carbide having a porosity of 63% and an average pore size of 20 μm was coated with 80 g/L of a washcoat by means of a conventional dipping method, which washcoat contained a copper-exchanged chabazite (SAR=30) having an amount of copper of 4.5 wt. % (calculated as CuO and based on the exchanged chabazite). The average particle size of the copper-exchanged chabazite was 1.43 μm. The coated wall flow filter was then dried and calcined at 350° C.

In a second step, the wall flow filter coated according to a) was provided with a second coating. To this end, coating with 30 g/L of a washcoat was effected by means of a conventional dipping method, which washcoat contained a copper-exchanged chabazite (SAR=30) having an amount of copper of 2 wt. % (calculated as CuO and based on the exchanged chabazite). The average particle size of the copper-exchanged chabazite was 1.93 μm. The coated wall flow filter was then dried, calcined at 350° C. and annealed at 550° C.

The amount of copper calculated over the entire wall flow filter was 3.8 wt. % (calculated as CuO and based on the exchanged chabazite).

The catalyst is referred to below as K2.

COMPARATIVE EXAMPLE 3

A commercially available wall flow filter made of silicon carbide having a porosity of 63% and an average pore size of 20 μm was coated with 110 g/L of a washcoat by means of a conventional dipping method, which washcoat contained a copper-exchanged chabazite (SAR=30) having an amount of copper of 3.8 wt. % (calculated as CuO and based on the exchanged chabazite). The average particle size of the copper-exchanged chabazite was 1.61 μm.) The coated wall flow filter was then dried and calcined. The catalyst is referred to below as VK3.

The $NO_x$ conversion of K2 and VK3 (and of VKB and VKC) was determined as described in example 1. The results are shown in FIG. 3.

The invention claimed is:

1. A particle filter comprising:
a wall flow filter and SCR-active material, wherein
the wall flow filter comprises channels which extend parallelly between a first and a second end of the wall flow filter, which are alternatingly sealed in a gas-tight manner either at the first or at the second end, and which are separated by porous walls whose pores have inner surfaces, and
the SCR-active material is located in the form of a coating on the inner surfaces of the pores of the porous walls, wherein the coating has a gradient, and wherein
a side of the coating facing the exhaust gas has a higher selectivity in the SCR reaction than a side of the coating facing the inner surface of the pores.

2. The particle filter according to claim 1, wherein the wall flow filter consists of silicon carbide, aluminum titanate, or cordierite.

3. The particle filter according to claim 1, wherein the wall flow filter in the uncoated state has a porosity of 30 to 80%.

4. The particle filter according to claim 1, wherein the wall flow filter has an average pore size in the uncoated state of 5 to 30 micrometers.

5. The particle filter according to claim 1, wherein the SCR-active material comprises a small-pore zeolite that is exchanged with copper and/or iron.

6. The particle filter according to claim 5, wherein the small-pore zeolite belongs to the AEI, CHA (chabazite), ERI (erionite), LEV (levyne), AFX, DDR, or KFI structure type.

7. The particle filter according to claim 5, wherein the small-pore zeolite is an aluminum silicate, silicoaluminophosphate, or aluminophosphate.

8. The particle filter according to claim 5, wherein the amounts of iron or copper are 0.2 to 6 wt. %, calculated as $Fe_2O_3$ or CuO and based on the total weight of the exchanged small-pore zeolite.

9. The particle filter according to claim 1, wherein the coating consists of two or a plurality of layers which differ with respect to the selectivity of the SCR-active material, wherein the outermost layer facing the exhaust gas has the highest selectivity and the innermost layer has the lowest selectivity.

10. The particle filter according to claim 1, wherein the coating consists of two layers, wherein the layer facing the exhaust gas has a higher selectivity in the SCR reaction than the layer facing the inner surface of the pores.

11. The particle filter according to claim 1, wherein the term "selectivity" is defined as the quotient from the conversion of NOx and the conversion of $NH_3$, that is, $$S = X_{(NOx)}/X_{(NH3)}$$

applies, where S is the selectivity, $X_{(NOx)}$ the conversion of $NO_x$ in %, and $X_{(NH3)}$ the conversion of $NH_3$ in %.

12. The particle filter according to claim 11, wherein in order to determine $X_{(NOx)}$ and $X_{(NH3)}$, a wall flow filter is coated with the SCR-active material of each coating, then hydrothermally aged for 16 hours at 800° C., and then the conversion of $NO_x$ or $NH_3$ is determined at 500° C. in a test gas with the following composition:

| | |
|---|---|
| $N_2$ | Balance |
| $O_2$ | 10 percent by volume |
| NOx | 500 ppm |
| $NO_2$ | 0 ppm |
| $NH_3$ | 750 ppm |
| CO | 350 ppm |
| $C_3H_6$ | 100 ppm |
| $H_2O$ | 5 percent by volume |
| GHSV/h$^{-1}$ | 60,000 | and the quotient $X_{(NOx)}/X_{(NH3)}$ is then calculated.

13. The particle filter according to claim 1, wherein the amount of coating with SCR-catalytically active material amounts to 70 to 150 g/L, in relation to the volume of the wall flow filter.

14. The particle filter according to claim 1, wherein the coating with SCR-active material consists of two layers each containing a small-pore zeolite exchanged with copper, wherein the small-pore zeolite of the layer facing the exhaust gas contains 0.3 to 3 wt. % Cu, calculated as CuO and based on the exchanged zeolite of this layer, and the small-pore zeolite of the layer facing the inner pore surface contains 0.5 to 5 wt. % Cu, calculated as CuO and based on the exchanged zeolite of this layer.

15. The particle filter according to claim 1, wherein the coating with SCR-active material consists of two layers each containing a copper-exchanged zeolite, wherein the zeolite contained in the layer facing the exhaust gas contains less CU, calculated as CuO and based on the exchanged zeolite of this layer, than the zeolite contained in the layer facing the inner pore surface.

16. The particle filter according to claim 1, wherein the coating with SCR-active material consists of two layers each containing a copper-exchanged zeolite of the chabazite (CHA) structure type, wherein the zeolite of the layer facing the exhaust gas contains less than 3 wt. % Cu, calculated as CuO and based on the exchanged zeolite of this layer, and the zeolite of the layer facing the inner pore surface contains more than 3 wt. % Cu, calculated as CuO and based on the exchanged zeolite of this layer.

17. The particle filter according to claim 1, wherein the coating with SCR-active material consists of two layers each containing a copper-exchanged zeolite of the levyne (LEV) structure type, wherein the zeolite of the layer facing the exhaust gas contains less than 3 wt. % Cu, calculated as CuO and based on the exchanged zeolite of this layer, and the zeolite of the layer facing the inner pore surface contains more than 3 wt. % Cu, calculated as CuO and based on the exchanged zeolite of this layer.

18. A method for purifying exhaust gas of a lean-operated combustion engine, which comprises passing the exhaust gas over a particle filter according to claim 1.

19. A device for purifying exhaust gas of lean-operated combustion engines, wherein it comprises a particle filter according to claim 1 and an injector for a reducing agent.

20. The device according to claim 19, wherein the reducing agent is an aqueous urea solution.

21. The device according to claim 19, wherein it comprises an oxidation catalyst.

22. A device for purifying exhaust gas of lean-operated combustion engines, which comprises a particle filter according to claim 1 and a nitrogen oxide storage catalyst.

* * * * *